United States Patent [19]

Walker

[11] Patent Number: 5,205,520

[45] Date of Patent: Apr. 27, 1993

[54] RETAINING BLOCK FOR CLAMPING SYSTEM

[75] Inventor: William R. Walker, Rochester, Mich.

[73] Assignee: Hydro-Craft, Inc., Rochester Hills, Mich.

[21] Appl. No.: 888,883

[22] Filed: May 26, 1992

[51] Int. Cl.⁵ .............................................. F16L 3/08
[52] U.S. Cl. ................... 248/74.1; 248/68.1; 285/61; 285/137.1
[58] Field of Search ............ 248/68.1, 74.1, 65, 248/74.4; 285/61, 137.1, 158, 64, 62, 417; 24/279

[56] References Cited

U.S. PATENT DOCUMENTS

| | | |
|---|---|---|
| 3,397,431 | 8/1968 | Walker . |
| 3,414,220 | 12/1968 | Walker . |
| 4,516,296 | 5/1985 | Sherman . |
| 4,878,696 | 11/1989 | Walker . |
| 4,900,065 | 2/1990 | Houck ......................... 285/137.1 X |
| 4,934,635 | 6/1990 | Sherman . |
| 4,997,148 | 3/1991 | Sherman . |
| 5,014,940 | 5/1991 | Sherman . |
| 5,071,169 | 12/1991 | Moschet ....................... 285/137.1 X |
| 5,098,047 | 10/1992 | Plumley . |
| 5,115,542 | 5/1992 | Gehres ......................... 248/68.1 X |
| 5,141,186 | 8/1992 | Cusic ........................... 248/68.1 X |

FOREIGN PATENT DOCUMENTS

| | | | |
|---|---|---|---|
| 1309359 | 10/1962 | France ................................. 285/61 |
| 1373067 | 8/1964 | France ................................. 285/61 |

Primary Examiner—J. Franklin Foss
Attorney, Agent, or Firm—Harness, Dickey & Pierce

[57] ABSTRACT

A retaining block designed to support an undersized fluid line junction adapter to fit within a conventional plural line clamping system used for larger size junction adapters. The clamping system includes two opposed U-shaped clamping units or channels with semi-cylindrical collar support portions that encircle, center and hold cylindrical collars of the larger size junction adapters, and are spaced from one another by substantially stacking nuts. The retaining block includes a central body support portion and two cylindrical collar support portions, one located on each axial side of the central support portion. The retaining block fits within the channels of the plural line clamping system, and its cylindrical collar support portions are sized to physically contact and be secured by those of the channels. The retaining block has a passageway that extends entirely through the block's axial length. The interior walls of the passageway include first and second interior ridges which are positioned on either side of a shaped interior portion that is complementary to the shape of the central body of the junction adapter. The combination of these features operate to completely secure the undersize junction adapter in all directions within the retaining block, which in turn is completely secured by the channels and adjacent stacking nuts of the clamping system.

12 Claims, 3 Drawing Sheets

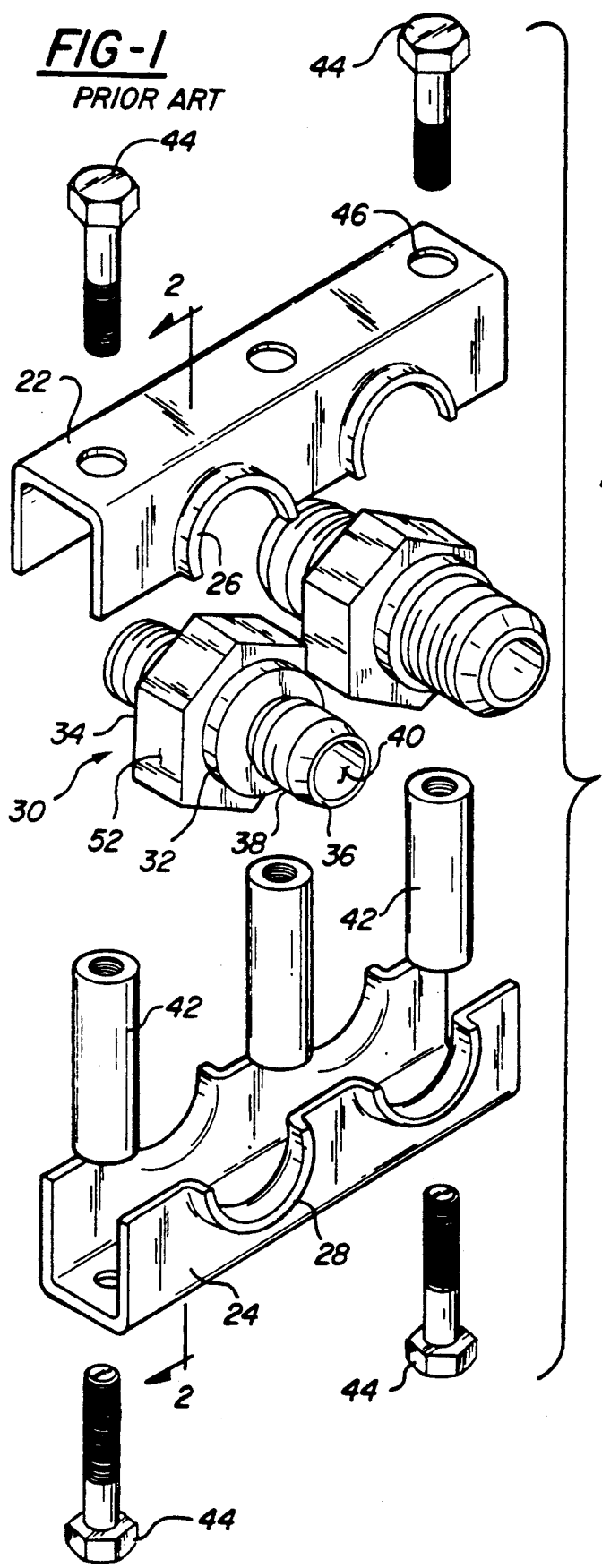
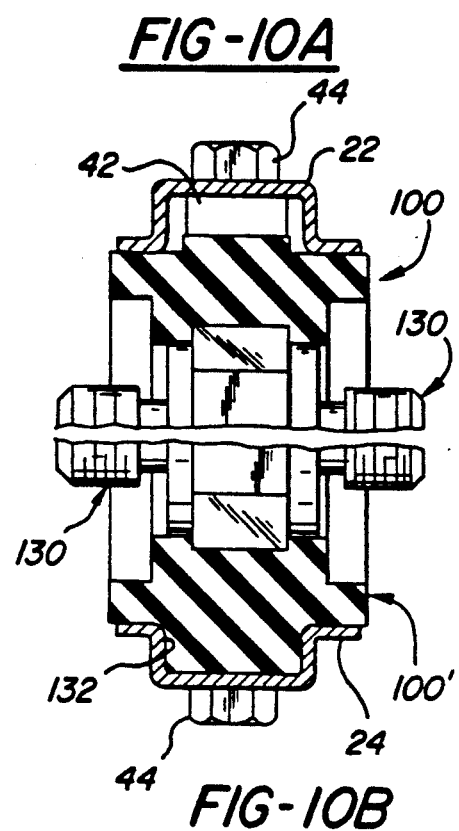
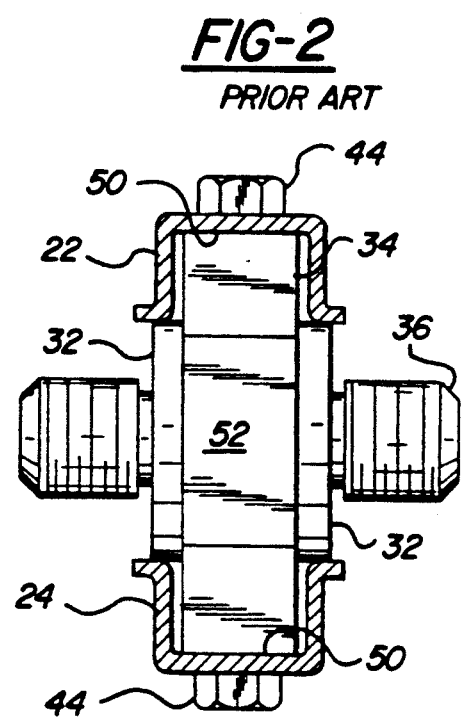

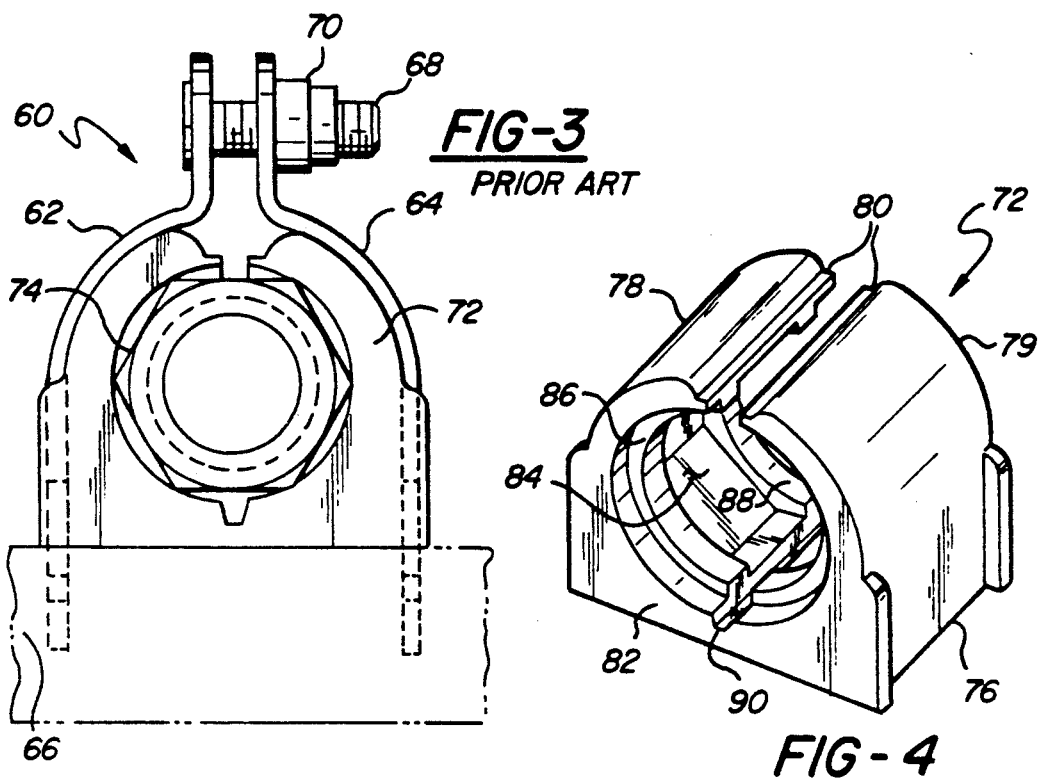
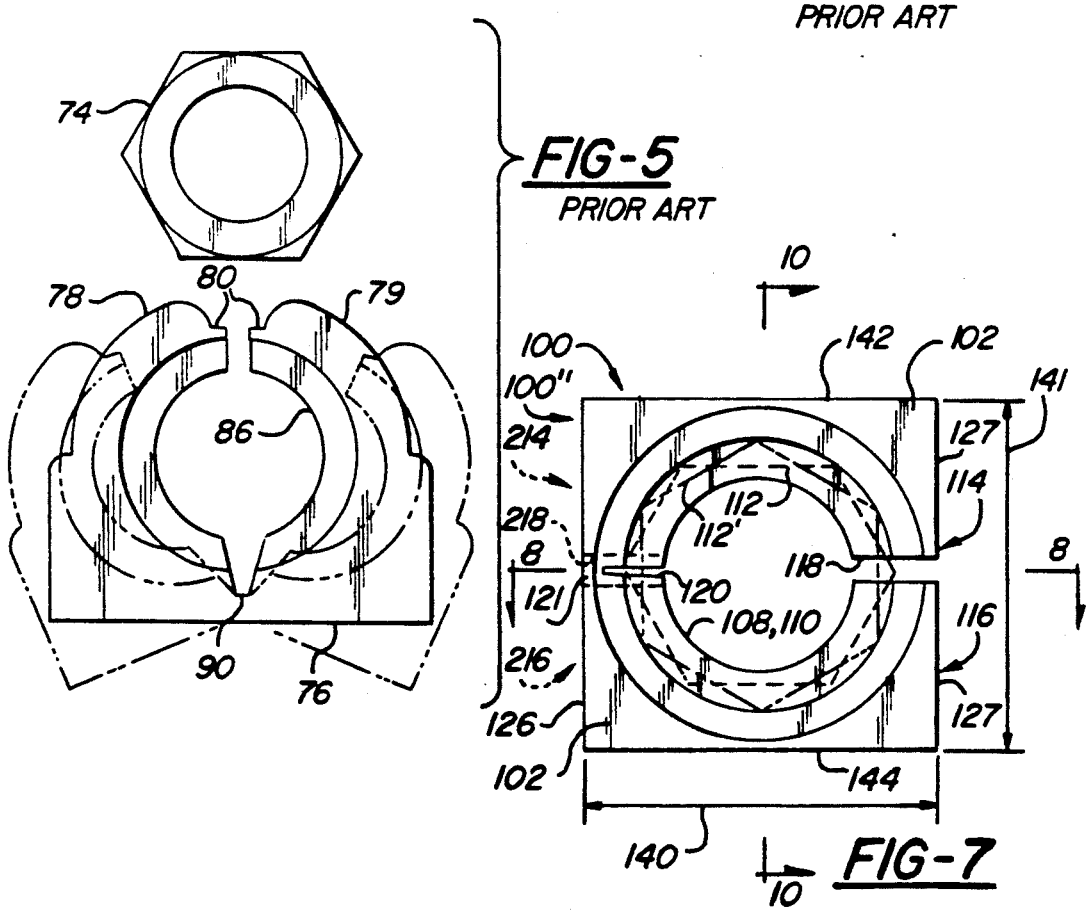

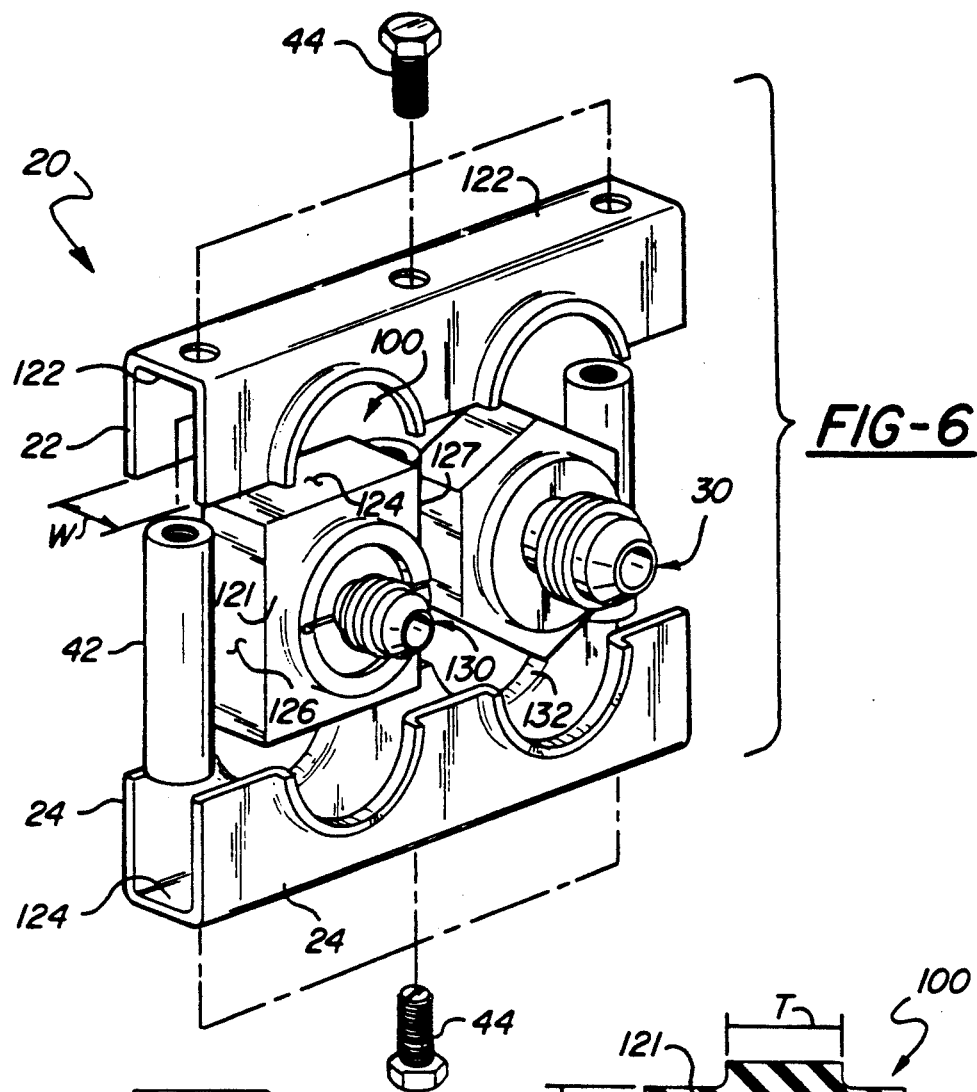
FIG-6
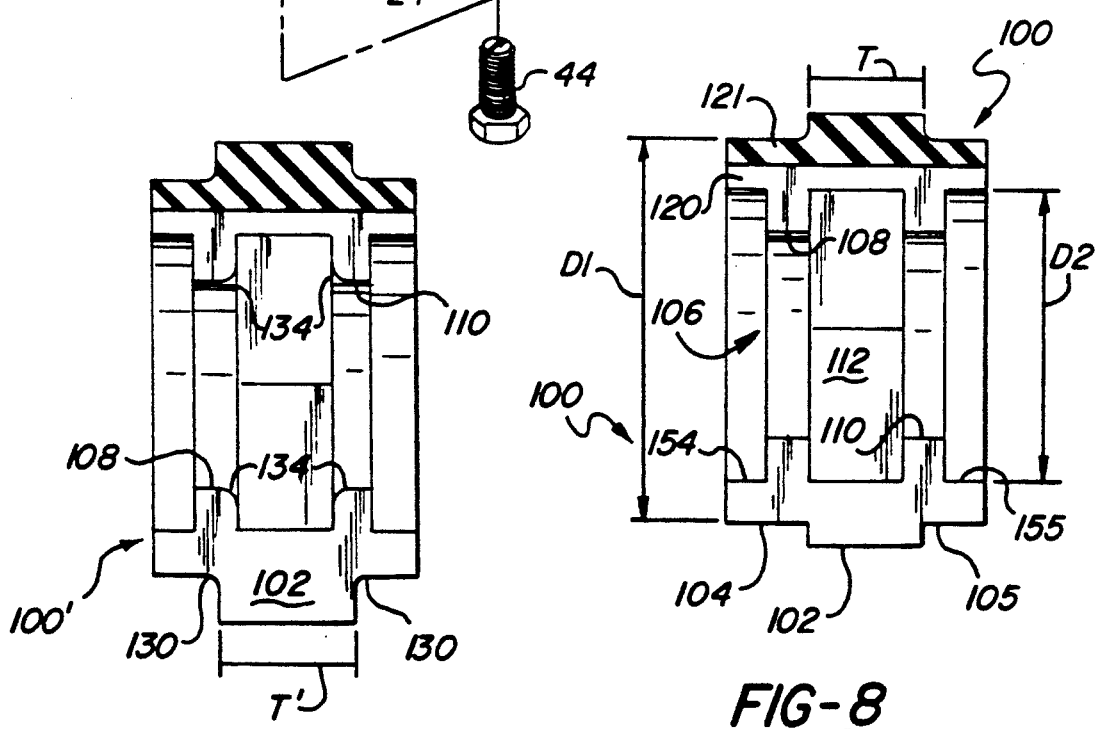
FIG-9
FIG-8

1

RETAINING BLOCK FOR CLAMPING SYSTEM

BACKGROUND OF THE INVENTION

The present invention relates generally to conventional plural line clamping systems of the type with a pair of U-shaped clamping units or channel members facing one another and, specifically, to a retaining block which enables a junction adapter designed for one size of a plural line clamping system to be used in a larger-sized plural line clamping system.

Plural line clamping systems are widely used in the hydraulics industry whenever it is necessary to connect plural fluid lines together on a machine. Such clamping systems provide a single mounting device for securing multiple junction adapters that connect a plurality of fluid lines from a machine, or the like, to other fluid lines heading to a source of fluid power. In addition, plural line clamping systems fix the junction adapters on uniform centers so that the lateral distance between the centers of any two junction adapters is equal, regardless of the size of the fluid lines which they connect. Plural line clamping systems and various types of junction adapters are disclosed in U.S. Pat. Nos. 3,397,431, 3,414,220 and 4,878,696, all issued in the name of William R. Walker and assigned to the assignee of the present invention, namely, Hydro-Craft, Inc., of Rochester Hills, Mich. In addition, Applicant has filed co-pending U.S. patent application Ser. No. 07/733,344 on Jul. 22, 1991, which discloses an improved hexagonal junction adapter with retaining shoulders. All of the above patents and the co-pending application are hereby incorporated by reference.

Since their introduction, plural line clamping systems such as those available from Hydro-Craft, Inc. and sold under the trademark "MULTI-CLAMP", have become quite popular and are widely used in the machine tool industry to route and secure hydraulic and pneumatic piping, tubing and other lines in a neat, orderly and efficient manner. The junction adapters used in these clamping systems permits the fluid lines to be disconnected and reconnected from time-to-time without damage, which may be necessary, for example, when equipment is being moved or serviced. Plural line clamping systems, in general, provide a simple and sturdy mount for multiple junction adapters and have been and are widely used in almost any hydraulics applications having plural fluid lines. There are currently several tens of thousands of MULTI-CLAMP ® installations in use in the United States and other countries, and MULTI-CLAMP ® assemblies and junction adapters in several standard sizes have been sold for years by the assignee and its distributors.

The basic arrangement of a common plural line clamping system can be seen from reviewing the above-cited patents or by reviewing the prior art FIGS. 1 and 2. As can be seen in FIG. 1, a metal plural line clamping assembly 20 generally includes a stamped U-shaped top unit or channel 22 and an opposed stamped U-shaped bottom unit or channel 24. Of course, the channels could also be disposed vertically, in which case they would be called left and right channels. The channels 22, 24 are formed with a plurality of uniform-sized semi-cylindrical collars 26, 28 that support junction adapters 30 at cylindrical collar portions 32 formed on each junction adapter 30. It should be understood that the assembly shown in FIG. 1 is an example only and there could be additional sets of semi-cylindrical collars 26, 28 supporting additional junction adapters located further along the channel members 22, 24. As discussed in the prior patents, the plural line clamping system 20 can have two to ten or more sets of semi-cylindrical collars 26, 28 with each collar set being adapted to support a junction adapter 30 on a center uniformly spaced from adjacent centers.

Each junction adapter 30 is shown to be formed having a hexagonally shaped central support portion 34, two cylindrical collar portions 32, and two cylindrical line connection portions 36. In year past, junction adapters having a central body of rectangular configuration have also been made, as illustrated in the first two patents mentioned above. As best illustrated in FIG. 2, the central support portion 34 of each hexagonal junction adapter 30 fits between the U-shaped channels 22, 24 while the collar support portions 32 are disposed between the opposed semicylindrical collars 26, 28 of the U-shaped channels 22, 24. Each cylindrical portion 36 has a threaded portion 38 formed on its outer surface, to permit lines, such as pipe, tubing or hose with threaded connectors on the ends thereof, to be removably connected to the junction adapter. While threaded male connections are illustrated in the Figures it is known to use junction adapters with other styles of line connections, such as the threaded female connections, as disclosed in U.S. Pat. No. 4,878,696.

A fluid passage 40 passes through the entire extent of the junction adapter 30 and is a passageway for fluid through fluid lines sealingly connected to either cylindrical portion 36 of the junction adapter 30 and running between a machine actuator and a source of power, a control valve, or the like.

Cylindrical stacking nuts 42, having a predetermined length, extend between the channels 22, 24 to separate the channels and further secure each junction adapter 30 within the plural line clamping assembly 20. Bolts 44, which extend through holes 46 formed in the channels 22, 24, are fastened in screw thread holes 48 within the stacking nuts 42, as shown in FIGS. 1 and 2, to lock the opposed channels together.

Each junction adapter 30 is thus secured rigidly within the plural line clamping assembly 20 between the channel members 22, 24 and stacking nuts 42. Since the central support portion 34 of each junction adapter 30 has six equal faces or sides, an assembler merely needs to place the junction adapter 30 into the channel members 22, 24 and insert the bolts 44 into stacking nuts 42. Any two opposed sides 52 of the six sides of the junction adapter 30 can be oriented along the stacking nuts 42.

As mentioned previously, MULTI-CLAMP ® assemblies have been sold for years by the assignee in several standard sizes. The most commonly used MULTI-CLAMP ® clamping systems are constructed with the HC-10, HC-16 and HC-32 Series clamping units which support fluid lines on 1.5 inch, 2.0 inch and 3.0 inch centers, respectively. In addition, there are larger clamping unit series including the HC-46Series, HC-72 Series and HC-96 Series which have even progressively greater distances between centers than the HC-32 Series clamping units.

The junction adapters designed to work with a particular series of clamping units do not fit into the clamping units of a different series. The inability to fit varying sizes of junction adapters within a single clamping assembly has been a significant limitation to the MULTI-CLAMP ® assembly for more than 20 years. For example, if the junction adapters required for the fluid lines for a particular machine vary from the smaller diameter lines supported by the HC-10 series clamping units to the larger HC-16 clamping units, a single MULTI-CLAMP ® assembly heretofore could not accommodate all of the junction adapters in a single clamping unit. Therefore, two or more different separate series of clamping assemblies were required to mount and secure the fluid lines for such a machine or application. Similarly, if the lines required for a machine vary from those supported by the HC-16 clamping units to those supported by the HC-32 clamping units, then two different sizes of clamping assemblies are required to mount and secure the fluid line for that machine.

Another type of clamping system, known as a tubing clamping system, is also widely used in industry when it is necessary to secure cylindrical members such as tubing or pipe, or the junction adapters previously described, to a support surface. Such a clamping system is disclosed in U.S. Pat. No. 4,934,635, which is hereby incorporated by reference. Certain Figures from that patent are illustrated in FIGS. 3-5 here, which Figures are labeled prior art.

As can be seen in FIG. 3, the tubing clamping system 60 generally includes two clamp halves 62, 64 which are mounted to a support surface 66. The clamp halves 62, 64 are secured together by a threaded fastener 68 which is press fit into one of the clamp halves 62 and is fastened by a stop nut 70. A cushion insert 72 is disposed within the clamp halves 62, 64 and surrounds a fluid-carrying member 74, which may be tubing or may be a fitting such as a junction adapter, that is to be secured within the tubing clamping system 60.

As best illustrated in FIG. 4, the cushion insert 72 has a generally planar base portion 76 with two upwardly and inwardly extending arcuate sidewalls 78, 79 which are separated by a gap 80. A passageway 82 is formed through the longitudinal length of the cushion insert 72 and has a shaped interior portion 84 which is surrounded by first and second interior walls 86, 88. As best seen in FIGS. 4 and 5, the cushion insert 72 has a groove or slot 90 which is formed along the bottom surface of the passageway 82. The slot 90 acts as a hinge for the sidewalls 78, 79 to enable them to be easily spread apart to receive a fluid-carrying member 74.

Once placed within the tubing clamping system 60, the fluid-carrying member 74 is secured between the first and second interior walls 86, 88 and is disposed within the shaped interior portion 84 (here shown with hexagonal sidewalls) of the passageway 82. The cushion insert 72 acts to prevent undesired axial shifting or rotation of the member 74, as well as to absorb shock and vibration within the tubing clamping system 60.

Although the clamping system of the type described in FIGS. 3-5 has been successful, it does not help to secure multiple fluid lines which vary greatly in size into a MULTI-CLAMP ® clamping assembly. It does not have the correct configuration for use in a MULTI-CLAMP ® clamping assembly, and represents a fundamentally different approach to implementing a plural line clamping system.

In light of the foregoing discussion, it is a principal object of the present invention to provide an easy-to-use apparatus for use in a conventional plural line clamping system having clamping units (i.e., channel members) with semi-cylindrical collars to permit junction adapters of drastically varying sizes to be secured within one such clamping system.

A related object of the present invention is to provide a one-piece retaining block for use in a plural line clamping system having a pair of U-shaped clamping units which can easily be positioned around and adapt an undersized hexagonal junction adapter for use within a larger-size clamping system.

Still another object is to provide a retaining block which accomplishes the foregoing objects in a manner that is relatively low-cost, and allows the retaining block to be easily assembled by hand around a hexagonal junction adapter. Yet another object is to provide a retaining block which is sufficiently strong to retain the junction adapter securely within the clamping system in spite of the substantial forces resulting from hydraulic pressures, shock and vibration which are transmitted to the junction adapter.

A further object is to provide a retaining block which helps absorb the shock and vibration created by such forces, thereby reducing noise and the transmission of further vibrations through the clamping system.

SUMMARY OF THE INVENTION

The foregoing objects are achieved by the retaining block of the present invention. The retaining block is designed to allow a conventional fluid line junction adapter for one size of a MULTI-CLAMP ® clamping system to be used in a larger size MULTI-CLAMP ® clamping system. Such clamping systems have two opposed U-shaped channel members or clamping units, each having semi-cylindrical collar portions. Stacking nuts are provided in such systems between the channel members to provide spacing and to secure the channel members together so as to restrain any junction adapters present within the system from moving. When the retaining block of the present invention is utilized, the retaining block is captured between the two opposed U-shaped channels, and between two adjacent stacking nuts.

The retaining block generally comprises a support portion and two cylindrical collar support portions, one located on each axial side of the central support portion. In addition, the retaining block has a passageway that extends through the entire axial length of the block. The passageway includes interior wall portions having first and second interior ridges which are positioned on either side of a shaped interior portion that is matched to the body of the junction adapter to be placed therein. The interior ridges are sized to snugly encircle the cylindrical collar portions of the junction adapter. The combination of these features operate to completely secure the junction adapter in all directions within the retaining block.

The retaining block fits within the channel members of the plural line clamping system, since the central support portion and cylindrical collar support portions are sized to form contacts and be secured by the channel members. In addition, an alternate configuration of the retaining block includes retaining shoulder portions which conform to the radiused surfaces long found between straight wall interior surfaces of the legs of the channel members and the semi-cylindrical collar portions of the legs.

These features enable the retaining block to adapt an undersized junction adapter for use within a given plural line clamping system in a manner which provides resistance to any movement of the junction adapter which might be caused by the forces resulting from fluid line pressures.

These and other features, objects and advantages of the present invention can be further understood by reading the detailed description below in conjunction with the drawings.

BRIEF DESCRIPTION OF THE DRAWINGS

In the drawings, like reference numerals refer to the same part or feature used in the various Figures, in which:

FIG. 1 is an exploded perspective view of a portion of a conventional plural line clamping assembly for securing two junction adapters shown therewith.

FIG. 2 is a cross-sectional view along section line 2—2 through the plural line clamping system shown in FIG. 1, when it is assembled, illustrating the placement of one of the junction adapters in the plural line clamping system.

FIG. 3 is a front elevational view of a conventional tubing clamping system for securing a junction adapter shown therein.

FIG. 4 is a perspective view of a conventional cushion insert for use with the tubing clamping system of FIG. 3.

FIG. 5 is a front elevational view of the cushion insert of FIG. 4, including phantom lines illustrating how the sidewalls of the cushion insert can be forced apart by hand to receive a junction adapter.

FIG. 6 is an exploded perspective view of a conventional plural line clamping assembly normally used for securing two junction adapters, shown with a regular-size junction adapter on the right, and an undersize junction size junction adapter on the left, held within a retaining block of the present invention.

FIG. 7 is a front elevational view of a retaining block of the present invention substantially similar to the one shown in FIG. 6.

FIG. 8 is a cross-sectional view along the line 8—8 through the retaining block of the present invention shown in part by dashed lines in FIG. 7.

FIG. 9 is a cross-sectional view of an alternate embodiment of the retaining block of the present invention similar to that shown in FIG. 7, as it would be seen sectioned the same was as FIG. 8.

FIG. 10 is a composite cross-sectional view of an undersize junction adapter secured in a retaining block held between the two U-shaped opposed channel members, such as would be seen if the retaining block were sectioned along line 8—8 of FIG. 7. FIG. 10A, the top half of FIG. 10, represents the upper half of a cross-section of the FIG. 8 retaining block. FIG. 10B, the lower half of FIG. 10, represents the lower half of a cross-section of the FIG. 9 retaining block, as would be seen if the retaining block were sectioned in a similar manner to the FIG. 10A section.

DETAILED DESCRIPTION OF THE PREFERRED EMBODIMENTS

Three different constructions of the retaining block of the present invention can be understood by studying FIGS. 6 through 10 and the following description of those Figures. The basic features of all three constructions can be understood by referring to the retaining block 100 shown in FIGS. 6, 7 and 8. Referring now to FIG. 6, a plural line clamping system 20, such as the one shown in FIG. 1, having a retaining block 100 for adapting an undersized hexagonal junction adapter 130 for use within the clamping system 20, is illustrated. As best understood in FIG. 6, the retaining block 100 is designed to adapt the junction adapter 130 to be snugly captured within the plural line clamping system 20 between the two channel members 22, 24 and adjacent stacking nuts 42.

As best illustrated in FIGS. 7 and 8, the retaining block 100 includes a generally rectangularly-shaped central support portion 102 and two cylindrical collar support portions 104, 105, one located on each axial side of the central support portion 102. Further, the retaining block 100 has a passageway 106 that extends the entire axial length of the block 100. First and second interior wall ridges 108, 110 are located within the passageway 106 and are positioned on either side of a shaped interior portion 112 of the passageway 106. The interior portion 112 preferably has a generally hexagonal shape which is indicated by the hidden (dashed) lines in FIG. 7. Therefore, as best shown in FIG. 8 when generally viewed from left to right, the retaining block 100 has a passageway 106, a first cylindrical collar support portion 104, a first interior wall ridge 108, a rectangularly-shaped central support portion 102, a shaped interior portion 112 constituting part of the passageway 106, a second interior wall ridge 110, and a second cylindrical collar support portion 105.

Referring now to FIG. 7, the retaining block 100 preferably has a one-piece construction, formed with two identical half sections 114, 116 that are separated by two gaps 118 and 120, and connected by a thin semi-flexible strip 121 of material, sometimes called a living hinge. The thinness of the strip 121 in a radial direction is controlled by the radial depth of gap 120, which can easily be changed as required. Preferably the living hinge 121 is made thin enough to permit the halves 114, 116 of the retaining block 100 to be spread apart by hand. In this manner, the junction adapter 130 can be hand-assembled into the retaining block 100. The gaps allow the halves 114, 116 of the retaining block 100 to be flexibly separated and spread apart to enable the retaining block 100 to be positioned about the junction adapter 130. The gap 120 need not be as large as the gap 118, but gap 120 does preferably extend throughout the entire axial length and a substantial portion of the lateral width of its side of the retaining block 100, as is shown by the non-cross-hatched portion 120 of FIG. 8. The thinness of the strip 121 faciliates flexing, and, thus, the easy separation of the halves 114, 116 of the retaining block 100 when positioning the retaining block 100 about the junction adapter 130.

As noted before in FIG. 7, the interior portion 112 of the passageway 106 is hexagonally-shaped and corresponds to the hexagonally-shaped central support portion 34 of the junction adapter 130. In addition to securing the junction adapter 130 in all lateral directions, this feature enables the retaining block 100 to prohibit unwanted rotation of the junction adapter 130. It should be noted, however, that the particular configuration of the shaped interior portion 112 of the passageway 106 may vary to accommodate other types of junction adapters or other fluid line fittings which are described in the prior art (i.e., a rectangular junction adapter) or which may be developed in the future and are desired to be secured within the plural line clamping system 20.

The first and second interior ridges 108, 110 operate to snugly confine the central body portion of the junction adapter 130, and also its cylindrical collar support portions 32, as illustrated in FIG. 10. In this manner, the junction adapter 130 is secured within the retaining block 100 in the axial direction as well as all radial directions. Therefore, the shaped interior portion 112 of the passageway 106 and the first and second interior walls 108, 110 operate to completely secure junction adapter 130 in all directions when the retaining block 100 is positioned about the junction adapter 130.

Referring once again to FIGS. 6, 7 and 8, the retaining block 100 fits within the channel members 22, 24 of the plural line clamping system 20 as shown. The generally rectangularly-shaped central support portion 102 of the retaining block 100 may be sized, if desired, to form plane contacts with the channel members 22, 24 at locations 122, 124. The axial thickness of the central support portion 102 is indicated by the reference "T" in FIG. 8. The internal distance or width W between the channel members 22 and 24 is indicated by the letter "W" shown in FIG. 6. This is the distance between opposed interior side walls formed by the legs of each of the channel members 22, 24. The axial thickness T of the central support section 102 of retaining block 100 may be less than the width W, as illustrated in FIG. 10A.

The cylindrical stacking nuts 42 secure the retaining block 100 laterally along the two opposed side walls 126 and 127 of the central support portion 102 of the retaining block 100. The horizontal dimension 140 of the retaining block 100 may be made substantially equal to the distance between adjacent cylindrical stacking nuts or may be made slightly smaller than the distance between stacking nuts. When the horizontal dimension 140 is made equal to the distance between two adjacent stacking nuts, line contacts are formed between the retaining block 100 and stacking nuts 42 at the outer side walls 126 and 127 of block 100. With either aforementioned size for dimension 140, the central support portion 102 of the retaining block is captured between adjacent stacking nuts, and helps prevent rotation of the retaining block in the fully assembled clamping system.

The vertical dimension 141 of the central support portion 102 of the retaining block 100 may be made to be the same as dimension 140 or may be made larger, so that it is substantially equal to the distance between the interior connecting portions 124 of the channel members 22, 24. Each approach has different advantages. The first approach, where the dimensions 140 and 142 are substantially equal, resulting in a generally square cross-section as illustrated in FIG. 7, provides an advantage in assembly of the retaining block into the clamping system. This advantage is that the retaining block may be turned plus or minus degrees 90° from its normal orientation shown in FIGS. 6 and 7, and installed into the clamping system 20. This means that an assembler need not pay attention to whether the plane defined by the gaps 118 and 120 are horizontal or vertical. Either orientation of the retaining block 100 will work.

In the second approach, where the dimension 141 is substantially equal to the height of the stacking nuts 42, which is shown in FIG. 6, an assembler must assemble the retaining block into the clamping system 20 in the orientation shown in FIG. 6. This approach has the advantage of providing positive contact between the top and bottom surfaces 142 and 144 of the retaining block and the inside surfaces 122 and 124 of channel members 22, 24.

Referring now to FIG. 8, the outer diameter D1 of each of the cylindrical collar support portions 104, 105 of the retaining block 100 is preferably made equal to or preferably slightly larger than the diameter encompassed by the opposed semi-cylindrical collar portions 26, 28 formed in the channel members 22, 24 when they are assembled and tightened in clamping system 20 shown in FIG. 1. Cylindrical collar support portions 104, 105 are preferably provided with respective bore portions 154, 155 as shown. The internal diameter D2 of each bore portion should be sufficiently large to provide the necessary space and clearance around the male threaded connection portions of the junction adapter to allow fluid line connectors to be easily attached and tightened down to those threaded connection. The clearance space provided by the bore portions around the connection portions of the junction adapter is best illustrated in FIG. 10.

FIG. 6, in conjunction with FIG. 9, shows an alternate embodiment of the present invention, namely retaining block 100'. In this alternate embodiment 100', the axial thickness T of the central support section 102 has been increased as shown at T' so that it spans the distance W between the opposed interior side walls of the "U" formed by each channel member. This condition is best illustrated in FIG. 10B, and creates a completely snug fit between the retaining block 100 and the channel members 22, 24. This further helps constrain the retaining block 100' against axial movement when it is installed in the clamping system 20. Note that retaining block 100' includes two retaining shoulder portions 130, each located between the central support portion 102 and a cylindrical collar support portion 104, 105. Each retaining shoulder portion 130 is designed to abut the radius formed in the channel members 22, 24 about their semi-cylindrical collar portions 26, 28, as shown, for example, at locations 132 in FIGS. 6 and 10, when the retaining block 100' is installed in the clamping system 20. The convex radiused surfaces like surface 132 have long been present in the channel members 22, 24. In other words, each retaining shoulder portion 130 is a concave radiused surface which is complementary to and snugly fits against the adjoining convex radiused surface (shown at 132 in FIG. 6) created in the channel members 22, 24 by the semi-cylindrical collar portions 26, 28, as best shown in FIG. 10B. Further, as shown in FIG. 9, the first and second interior wall ridges 108, 110 may also preferably include concave radiused surfaces 134 which are designed to abut and fit snugly against the adjoining convex radiused surfaces of the improved hexagonal junction adapter that is disclosed in Applicant's co-pending patent application Ser. No. 07/733,344.

Referring once again to FIG. 7, an alternate two-piece embodiment of the present invention is also shown, which may be conveniently called retaining block 100". In this embodiment, a larger gap 218 (shown in dashed lines) is included in place of gap 120. Therefore, the retaining block 100 has two actual half sections 214, 216 which are completely separated to enable the retaining block to be positioned about junction adapter 130. With respect to all the other features of the present invention described above, the two-piece embodiment 100" of the retaining block is equivalent to the one-piece embodiment. Note that when the retaining block 100", with its two separate half sections, is used, the shaped interior portion 112 may, if desired, have its orientation changed 30° to the orientation indicated by phantom lines 112'.

Retaining block 100, 100' and 100" of the present invention are preferably manufactured from any conventional or suitable thermosetting or thermoplastic material having sufficient rigidity to withstand the substantial forces and vibration imposed by hydraulicallyinduced forces transmitted to the junction adapter or other fluid fitting to be secured into a plural line clamping system by the retaining block. Rigid plastic materials are preferred because they may easily be molded into the relatively complex shape for the retaining blocks of the present invention using conventional manufacturing processes such as plastic injection molding, in very few manufacturing steps.

Alternatively, the retaining block may also be formed by a metal casting made of any conventional or suitable casting material, such as aluminum, zinc or iron alloys. When metals are used, the retaining block is preferably made in two separate pieces. Alternatively, the hinge means may be provided in the form of a separately manufactured conventional hinge with two hinge plates and a hinge pin. Such a conventional hinge may be screwed or riveted onto the sides of the retaining block where the living hinge would otherwise be located. Note that such hinges may also be used in place of the living hinge, if desired, in a retaining block made of plastic.

The size of the retaining block of the present invention shown in FIGS. 6 through 10 generally is intended to depict an undersize junction adapter 130 being used in the clamping assembly designed for the next larger size of junction adapter. For example, these Figures may be said to illustrate a retaining block of the present invention sized to adapt a junction adapter designed to fit into the MULTI-CLAMP® HC-10 Series into MULTI-CLAMP® HC-16 Series clamping units, or sized to adapt a junction adapter designed to fit into the MULTI-CLAMP® HC-16 Series into MULTI-CLAMP® HC-32 Series clamping units. The design of the retaining block of the present invention can be scaled up or down to fit the other adjacent series of MULTI-CLAMP® units as well. Furthermore, it should be appreciated that the design of the retaining block of the present invention can readily be scaled to allow an undersize junction adapter designed for one series of clamping units, such as the HC-10 Series, to be fit into clamping units that are two or more sizes larger, such as the HC-32 Series or HC-46 Series clamping units.

Although several working embodiments of the retaining blocks of the present invention have been disclosed, those skilled in the art will appreciate that modifications may be made by the exercise of their routine skill. Such modifications are within the contemplated scope of the present invention as set forth in the appended claims, including all fair equivalents thereof.

I claim:

1. A retaining block for securing a junction adapter of a first size, into a plural line clamping system for junction adapters of a second size larger than the first size, the junction adapters of the first size having a central body portion of predetermined configuration, and two cylindrical collar portions located on opposite sides of the central body portion, the clamping system being the type having (1) a plurality of channel members, each of generally U-shaped cross-section and each provided with two leg sections separated by a predetermined distance and joined by a connecting section therebetween, the leg sections having interior wall surfaces and provided with semi-cylindrical collar portions formed at the outer ends thereof, the collar portions each including a semi-cylindrical surface and a radiused surface extending from the semi-cylindrical surface and an adjoining interior wall surface of its respective leg section, and (2) stacking nut means, disposed between and for separating the channel members in an assembled position with the U-shapes of the channel members facing each other and pairs of semi-cylindrical collar portions opposing each other and encompassing a diameter, the retaining block comprising:

a generally rectangularly-shaped central support portion adapted to be received between the channel members when facing each other in an assembled position; and two substantially cylindrical collar support portions, each of the cylindrical collar support portions located at an axial side of the central support portion, and sized to span the diameter encompassed by one pair of the opposed semi-cylindrical collar portions and to be snugly held therebetween; and two interior ridge portions, spaced from one another by the axial thickness of the central body portion of the junction adapter, the retaining block having a passageway extending through the entire axial length thereof, the passageway having a shaped interior portion between the two ridge portions generally corresponding to the predetermined configuration of the central body portion of the junction adapter, thereby helping prohibit axial and rotational movement of the junction adapter when installed in to the retaining block, the two interior ridge portions each forming part of the passageway and having an internal diameter corresponding to the cylindrical collar portions of the junction adapter, and the retaining block being formed in two half sections capable of being spread apart to enable the junction adapter to be positioned within the retaining block.

2. The retaining block as recited in claim 1, further comprising:

two retaining shoulder portions, each shoulder portion being formed between the central support portion and a respective one of the cylindrical collar support portions and when the retaining block is installed in the channel members snugly conforming to the radiused surfaces extending between the semi-cylindrical collar support surfaces and adjoining interior wall surfaces of the leg sections of the channel members.

3. The retaining block as recited in claim 2, wherein the rectangularly-shaped central support portion has an axial thickness substantially equal to the predetermined distance and is received snugly within the channel members when installed into an assembled plural line clamping system, whereby the central support portion generally abuts the leg sections of the channel members which thereby assist in resisting movement of the retaining block within the plural line clamping system.

4. The retaining block as recited in claim 3, wherein:
the retaining block is a one-piece retaining block, and
the two half sections are on opposite sides of the passageway by at least a first elongated gap.

5. The retaining block as recited in claim 4, further comprising:

hinge means extending between the two half sections for forming a living hinge interconnecting the two half sections, thereby enabling the half sections of the one-piece retaining block to be flexibly separated and spread apart.

6. The retaining block as recited in claim 5, wherein the hinge means include a second gap located on a side of the passageway diametrically opposite of the first gap, the second gap extending along the entire axial length of the passageway.

7. The retaining block as recited in claim 3, wherein the retaining block is a two-piece retaining block.

8. The retaining block as recited in claim 1, wherein shaped interior position of the retaining block corresponds to and snugly receives the central body portion of a hexagonal junction adapter.

9. A one-piece retaining block, which when disposed about a fluid having a central axis and a central exterior portion, adapts the fitting for use within a clamping system having two clamping units, with at least one pair of semi-cylindrical collar support portions spaced from one another on each clamping unit, the clamping units when assembled forming two generally cylindrical collar support portions concentrically arranged about a common axis, the retaining block comprising:

a central support portion, adapted to be received within the clamping system, and having a generally rectangular cross section;

first and second collar support portions spaced from one another on opposite sides of a central support portion and sized to be snugly received within the semi-cylindrical collar support portions of the assembled clamping units; and first and second interior wall ridges associated respectively with the first and second collar support portions and each interior wall ridge being configured to snugly receive a collar portion of the fluid line fitting;

the retaining block having a passageway extending the entire axial length of the retaining block the passageway having a shaped interior portion corresponding to the first exterior portion of the fitting for prohibiting rotational movement of the fitting; and each of the interior wall ridges being disposed within the passageway on an axial side of the shaped interior portion and corresponding to and bearing against a respective second exterior portion of the fitting, the retaining block at least a first gap extending along one axial side of the passageway, thereby defining two half sections of the retaining block, whereby the two half sections are capable of being apart to enable the fitting to be installed in the retaining block.

10. The retaining block as recited in claim 9, further comprising hinge means for assisting two half sections of the retaining block to be flexibly separated and spread apart.

11. The retaining block as recited in claim 9, wherein the hinge means includes a flexible strip portion common to both half sections and a second gap located on a side of the passageway diametrically opposite the first gap, the second gap along the slot extending the entire axial length of the passageway.

12. The retaining block as recited in claim 9, wherein the central support portion has a generally square cross-section.

* * * * *

UNITED STATES PATENT AND TRADEMARK OFFICE
CERTIFICATE OF CORRECTION

PATENT NO. : 5,205,520
DATED : April 27, 1993
INVENTOR(S) : W. Walker

It is certified that error appears in the above-indentified patent and that said Letters Patent is hereby corrected as shown below:

Column 2, line 11, replace "year" with --years--.

Column 2, line 29, after "fluid" insert --flowing--

Column 11, line 11, Claim 9, after "fluid", insert --line fitting--.

Column 12, line 13, Claim 9, after "block", insert --having--.

Column 12, line 17, Claim 9, after "being", insert --spread--.

Signed and Sealed this

Thirteenth Day of September, 1994

Attest:

BRUCE LEHMAN

Attesting Officer

Commissioner of Patents and Trademarks